ular pair are separated such that at distances between the vehicles, up to a predetermined minimum safe stopping distance, the windows constituting that pair are seen as two windows indicating an unsafe condition; for distances between the vehicles which are greater than the minimum stopping distance by a fixed amount, the two windows appear as one, indicating a safe condition, and for distances therebetween a hazy indication is viewed which indicates that caution must be exercised at that speed for that distance between the vehicles.

United States Patent [19]
Caine

[11] 3,868,629
[45] Feb. 25, 1975

[54] VISUAL COLLISION AVOIDANCE WARNING DEVICE

[76] Inventor: Harold A. Caine, 484 Kent Ct., Oceanside, N.Y. 11572

[22] Filed: Dec. 3, 1973

[21] Appl. No.: 420,952

[52] U.S. Cl. ............................................. 340/104
[51] Int. Cl. ............................................. B60q 1/00
[58] Field of Search .................................... 340/104

[56] References Cited
UNITED STATES PATENTS

| | | | |
|---|---|---|---|
| 2,257,420 | 9/1941 | Lau | 340/104 |
| 2,330,561 | 9/1943 | Dietrich | 340/104 |
| 3,152,317 | 10/1964 | Mayer | 340/104 X |
| 3,603,929 | 9/1971 | Drysdale | 340/104 |
| 3,715,721 | 2/1973 | Irving | 340/104 X |

*Primary Examiner*—Donald J. Yusko
*Attorney, Agent, or Firm*—Samson Helfgott

[57] ABSTRACT

A vehicle safety device which gives a visual indication to a driver of one vehicle when the distance between his vehicle and another vehicle is safe, unsafe or where caution must be used for the speed at which he is driving. The device is positioned with respect to the other vehicle and includes a housing having an illumination source and a screen impervious to light. The screen contains a plurality of pairs of windows. The windows constituting a pair are separated from each other by a spacing which depends upon the resolving power of the eye. For a predetermined speed, the windows constituting a partic-

18 Claims, 10 Drawing Figures

VISUAL COLLISION AVOIDANCE WARNING DEVICE

BACKGROUND OF THE INVENTION

This invention relates to vehicle safety devices and more particularly to a device which provides a visual indication to a driver when he is at a safe distance, an unsafe distance or within a caution range, relative to another vehicle, for the speed at which he is traveling.

One of the basic causes of vehicle collisions results from improper spacing between vehicles traveling along a given roadway. When one vehicle is forced to suddenly stop because of emergencies or other reasons, if a trailing vehicle is not spaced far enough behind the first vehicle, the trailing vehicle will not be able to stop within the distance and will instead collide with the first vehicle. The stopping distance is generally dependent both upon the reaction time of the driver as well as the time and space required to reduce the speed. It is well known that as speed increases, a greater distance is required in order to stop a vehicle.

Government agencies as well as automobile safety organizations provide recommended stopping distances for various speeds. They have also provided a rule of thumb that for each 10 miles of driving speed a driver should remain at least one car length behind another vehicle. In actuality this rule of thumb does not provide sufficient safe stopping distance, but much greater distances are required especially at higher speeds. While the recommended stopping distances are necessary for safe driving, in practice it is both difficult and impractical for a driver to properly gauge the distance between his vehicle and the vehicle in front or in back of him. Although the driver may be aware of the recommended safe distance, in practice there is little if any way that the driver can determine whether he is, in fact, the proper distance away from another vehicle. In addition, without any visual warning device, although a driver may want to keep a safe distance behind another vehicle, during the course of continuous driving on a highway, he may lose concept of ever changing distance requirements and subconsciously move to an unsafe following distance behind the preceding vehicle. This situation happens constantly since it is evident that vehicles on the highways are too close to each other and it is reported that almost 40 percent of automobile accidents are from rear-end collisions resulting from tailgating.

In the past there have been many devices suggested for indicating distances between vehicles. One such known device utilizes a light source which is dispersed into its basic colors by means of lenses, wherein the colors form diverging bands such that each color band is visible to a trailing car at a given distance. Other devices utilize complex equipment which must be installed on the dashboard of a vehicle and involves calibration between the speedometer and the device installed on the dashboard. Still other known devices use spaced lines formed on the rear view mirror to gauge distance.

While the known devices of the prior art may, in fact, provide an indication of the distance between vehicles, they are generally complex and require expensive installation as well as a great amount of training to the driver in how to utilize the distance determining equipment.

Furthermore, it generally requires the conscious awareness of a driver to concentrate on the equipment in order to determine the distance between his vehicle and that in front of him.

In U.S. Pat. No. 2,330,561 there is described another type of vehicle rear signal device having a single source of light which uniformly illuminates a number of windows which are spaced apart such that when a trailing vehicle is sufficiently behind a forward vehicle carrying the device, the windows appear to merge. As the trailing vehicle gets closer, the windows appear to separate. The number of windows distinguishable provides an indication of the distance away from the signal device.

While this rear signal device is easily installed and useful, the aforementioned patent has a number of drawbacks which prevent it from being utilized effectively. Firstly, there is no indication of the required spacing between the windows for predetermined speeds of the trailing vehicle. The reference only gives an indication of distance, but does not provide information relating to speed. Furthermore, the patent teaches the use of a plurality of windows, as for example four windows, so that as the rear vehicle approaches, the four windows are initially seen as one, and as the vehicle continues approaching there is subsequently seen two windows and finally four individual windows. Thus, effectively all the windows on the device are used in an inter-related manner. Because all four windows are utilized simultaneously, the patent of necessity requires uniform illumination from all the windows. Furthermore, there is no indication of suitable spacing needed for given speeds. In addition, the patent shows non-uniform spacing between the windows, but provides no indication of how such non-uniform spacing can be applied to other distances. In addition, all the windows are of uniform height.

It is accordingly an object of the present invention to provide a visual collision avoidance warning device which avoids the aforementioned problems of the prior art devices.

A further object of the present invention is to provide a device which gives an easily observable indication of whether a vehicle is at a safe, unsafe, or caution needed distance from another vehicle for the speed at which it is traveling.

Still a further object of the present invention is to provide a device which gives an instantaneous indication of the proper distance between vehicles for given speeds and which can be easily seen by the driver of a vehicle such that corrective action can be taken.

Yet another object of the present invention is to provide a device which can be easily installed on existing vehicles or easily incorporated within new vehicles being manufactured, and which provides an instantanous visual indication of proper distance between vehicles for predetermined speeds.

A further object of the present invention is to provide a device which can be installed on the rear of a vehicle for detection by a trailing vehicle, or on the front of a vehicle for detection by a forward vehicle and which provides an instantaneous indication of the proper safe spacing between the vehicles for the speed at which it is traveling.

Still a further object of the invention is to provide a visual collision avoidance warning device which includes a plurality of pairs of illuminated windows, the spacing between the windows constituting each pair being dependent on the particular speeds at which warnings are to be visually provided.

A further object of the present invention is to provide a visual collision avoidance warning device having a plurality of pairs of windows, the windows constituting a pair being spaced apart by a distance dependent upon the resolving power of the eye.

Another object of the present invention is to provide a visual collision avoidance warning device having a plurality of pairs of spaced apart windows, all of the windows being illuminated by a single color of light.

A further object of the present invention is to provide a distance indicating device for vehicles having a plurality of spaced apart windows, each pair of windows being illuminated by a different color of light.

These and other objects, features and advantages of the invention will, in part, be pointed out with particularity, and will, in part, become obvious from the following more detailed description of the invention, taken in conjunction with the accompanying drawings which form an integral part thereof.

SUMMARY OF THE INVENTION

Briefly, the invention provides an apparatus for installatoin in or on a first vehicle which provides a visual indication to the operator of a second vehicle, spaced apart from the first vehicle, when the distance between the two vehicles is safe or unsafe for the speed of the second vehicle and further provides visual indication of when caution is needed at that speed. The apparatus includes housing means positioned with respect to the first vehicle which incorporates illumination means; the housing being covered by a screen impervious to the illumination means. The screen is provided with at least one pair of windows. The windows constituting a pair are substantially identical and are separated from each other by a spacing which corresponds to the resolving power of the eye at the distance which represents the safe distance for the speed at which the second vehicle is traveling. The illumination from the windows of each pair is substantially equal and is sufficient to be seen by the driver of the second vehicle. The apparatus provides an instantaneous visual indication to the driver of the second vehicle whether he is at a safe distance or an unsafe distance for the speed at which he is traveling and also provides a visual indication of when he must use caution at the speed at which he is traveling.

BRIEF DESCRIPTION OF THE DRAWINGS

In the various figures of the drawings, like reference characters designate like parts.

In the drawings.

DESCRIPTION OF THE PREFERRED EMBODIMENTS

The present invention makes use of the optical principle that as you move away from objects, the objects appear as if they are both diminishing in size as well as merging together. Thus, if there are located 2 similar dots spaced apart from each other and positioned at a first location, as a viewer moves further away from the first location, a distance is reached whereupon any further movement away from the first location causes the dots to appear as if they merge and are therefore seen as a single dot. If the viewer moves closer to the first location, the dots reappear as separated and are seen as two individual dots. The ability to distinguish the one and the two dots are based upon the resolving power of the eye. The distance which a viewer must move away from the first location before the two dots will merge is a function of the resolving power of the eye.

Figure 1:
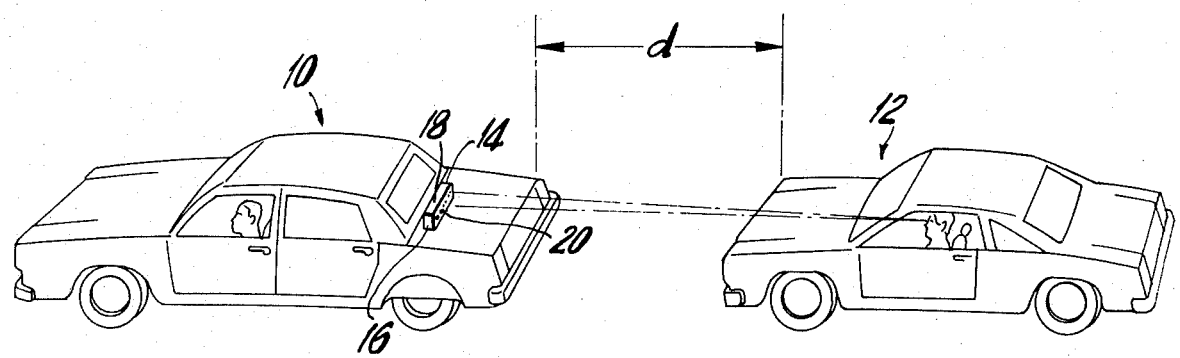
FIG. 1 is a perspective view of a first vehicle employing the system of the present invention and showing a second vehicle trailing the first vehicle.

Referring now to FIG. 1 there is seen a first vehicle, shown generally at 10 spaced apart by a distance $d$ from a second vehicle, shown generally at 12. Located on the rear of the first vehicle 10 is the warning device in accordance with the present invention and shown generally at 14. The driver of the second vehicle 12, looking in front of him, can see the warning device 14 on the vehicle 10 ahead of him. The warning device includes a housing 16 connected on to the upper trunk portion of the vehicle 10, and including a front screen 18 having a plurality of windows 20. The windows are positioned in pairs and are illuminated. The spacing between the windows constituting a given pair is a function of the predetermined speed at which warning is to be provided. For example, if a warning is to be provided to the driver of the vehicle 12 when he is traveling at 40 miles per hour and if the proper safe stopping distance needed between the vehicles is $d$, then the spacing between the pair of windows 20 on the device 14 will be such that at less than distance $d$, the driver of vehicle 12 will see the pair of windows as two individual windows. At distances greater than $d$, the driver of vehicle 12 will see the two windows merge into one. At around the distance $d$ itself, there will be a hazy region in which it will not be clear if one window or two windows are seen. In this manner, the driver of vehicle 12 traveling at 40 miles per hour and knowing that the windows on the device 14 are spaced for a visual indication at 40 miles per hour, can merely look at the device on the back of vehicle 10 and determine whether he is traveling at a safe distance or unsafe distance or is in a region in which caution is required. If he sees two illuminated windows, he recognizes that he is unsafe by being too close to the vehicle and must therefore provide additional distance for safety between the vehicles. If he sees one illuminated window, then he is assured that there is proper safe stopping distance between his vehicle and the preceding vehicle. If he is not sure if he sees one or two windows, then he is just at about the average stopping distance and he should use caution. Advisably he should increase his distance by decreasing his speed until he clearly sees one illuminated window or by changing lanes, or by passing the vehicle in front of him.

Figure 2:
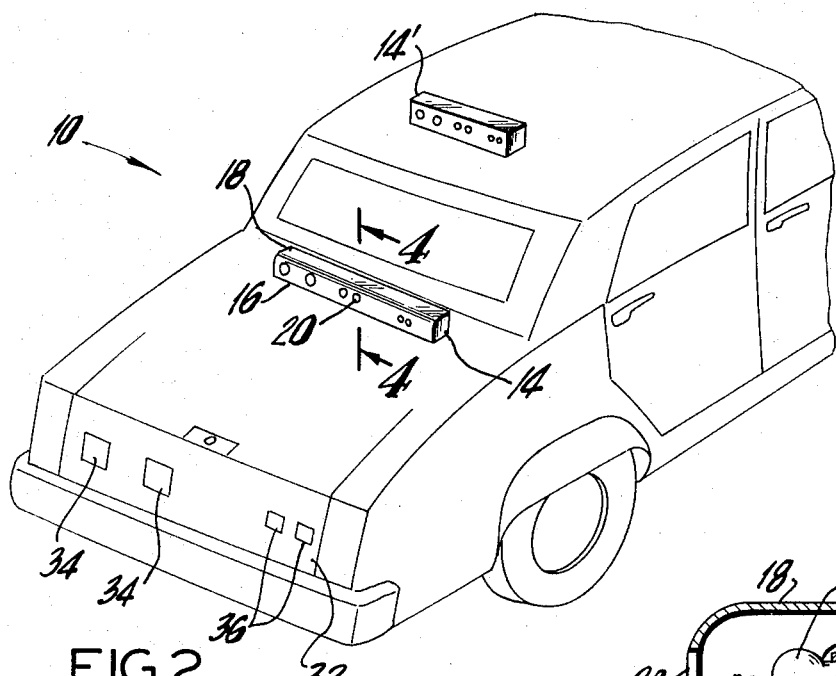
FIG. 2 is a perspective view of the rear of a vehicle employing the system of the present invention.

Referring now to FIG. 2, there is shown the single vehicle 10 having the device 14 located on the upper portion of its trunk. The location of the device 14 should be in a position easily viewable to the driver of the trailing vehicle. The device 14 shown as having a separate housing 16 can easily be mounted onto any easily viewable portion of the vehicle.

Figure 4:
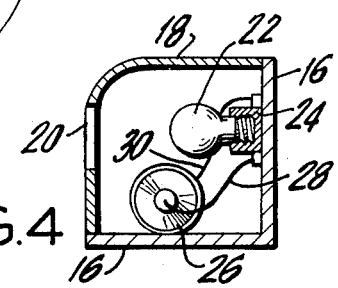
FIG. 4 is a sectional side elevation view of the device of this invention taken along line 4—4 of FIG. 2.

Referring now to FIG. 4, there is shown a sectional view taken along lines 4—4 of the device as shown in FIG. 2. It is seen that the device includes a housing 16 having a screen 18 on one side thereof and including a window 20 located within the screen 18. Within the housing there is provided illumination means 22, typically shown as an electric bulb secured to the housing 16 by means of a socket 24. A source of energy, typically shown as a battery 26 is included within the housing and by means of wires 28 and 30 energizes the bulb 22. In this manner light from the bulb 22 can be emitted through the window 20.

Instead of incorporating the energy source into the housing, it is possible to interconnect the device of the present invention to the automobile battery and include a switch on the dashboard whereby, as the driver of the vehicle enters, he turns ON the switch to energize the warning device located on his vehicle. Alternately, the device can be interconnected directly to the ignition switch such that when the ignition is turned ON or when the ignition switch is put into its accessory position, the warning device will automatically be illuminated.

In addition to providing a visual indication to a trailing vehicle, the present invention can be utilized to provide a visual indication to a forward vehicle, as will hereinafter be described. Therefore, the device can be located on top of the vehicle as shown at 14 whereby windows could be placed on the front and rear of the device and by utilizing a single illumination means can provide the visual indications to both the front and rear vehicles. Also using small illumination means such as light emitting diodes or the like, it would be possible to have a thin device with the same windows passing through the entire device such that the same windows could be used for both front and rear indications.

Although heretofore described, the device has been shown as an independent unit contained within a housing of its own and mountable upon a vehicle, referring again to FIG. 2 it is seen that the device can be incorporated as part of the tail light system 32 of the vehicle, wherein the windows 34 and 36 serve as both rear lights for the vehicle as well as providing the visual collision avoidance warning device of the present invention. In addition, the windows of the present invention could also serve as the turn signal lights by remaining in a usual ON state and blinking OFF to indicate a turn signal. It will be understood that with existing vehicles, the device in accordance with the present invention could be provided within a housing of its own and mountable onto the vehicle. With new vehicles being manufactured, it would be possible to incorporate the device directly into the vehicle either by means of separate windows with a separate illumination means, or as part of the tail light system of the vehicle. Furthermore, in place of bulbs, other illumination means can be utilized such as light emitting diodes, liquid crystals or other illumination means as is well known in the art.

Figure 3:
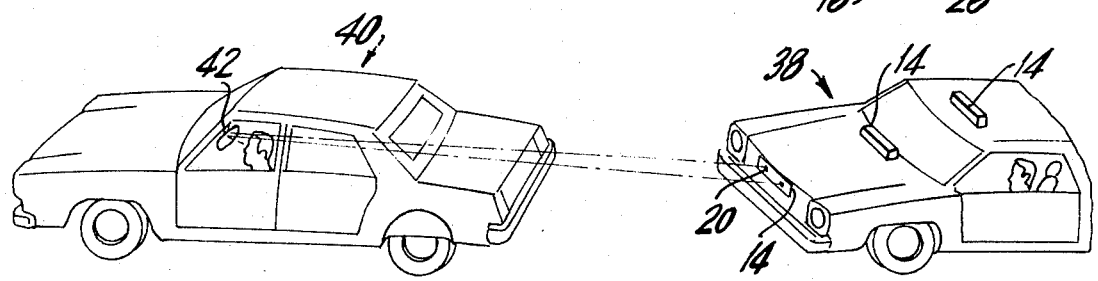
FIG. 3 is a perspective view of a vehicle employing the system of the present invention and a forward vehicle spaced from the first vehicle.

Referring now to FIG. 3 there is shown a rear vehicle 38 supporting the device 14, in accordance with the present invention and being located on the front hood of the vehicle. A forward vehicle 40, including a rear view mirror 42, can utilize the present invention to instantaneously determine the proper safe distance between the forward vehicle and the rear vehicle. The driver of the forward vehicle can look in his rear view mirror 42 and see the windows 20 on the device 14 located on the vehicle 38 in back of him. Through the rear view mirror 42 he can instantly visually determine whether he sees the two illuminated windows constituting a pair merge into one, whether he can see the two windows individually, or if he is in a region where the distinguishing between two windows and one window is hazy. If through his rear view mirror 42, he sees the two illuminated windows constituting a given pair as separate windows, he is aware that he is unsafe in that at the speed at which he is traveling he is too close. On the other hand, should he see one illuminated window for that given pair, he is assured that for the speed at which he is traveling he is a safe distance in front of the vehicle behind him and he can proceed accordingly. If he is unsure of whether he sees two windows or one window, he must use caution and either increase his speed or increase the distance between his vehicle and the vehicle behind him.

In this manner, not only can the device of the present invention provide a warning to a driver to be sure that he is far enough in back of another vehicle, but it can be utilized to provide assurance to a driver that he is far enough ahead of a trailing vehicle so that should he be forced to stop for an emergency, there will be sufficient distance such that the vehicle trailing him will have enough time to stop and the vehicle trailing him will not collide into him.

In addition to placing the device on the front of the hood, the device could be placed below or above the windshield as shown in FIG. 3, or on the top of the vehicle for both front and rear indications. Also, it could be directly built into the front or rear windshield itself. For trucks or station wagons, it could be mounted on the back flat surface of the vehicle. Furthermore, it could be mounted vertically and/or a pair of the devices placed one on either side of the vehicle.

Figure 5:
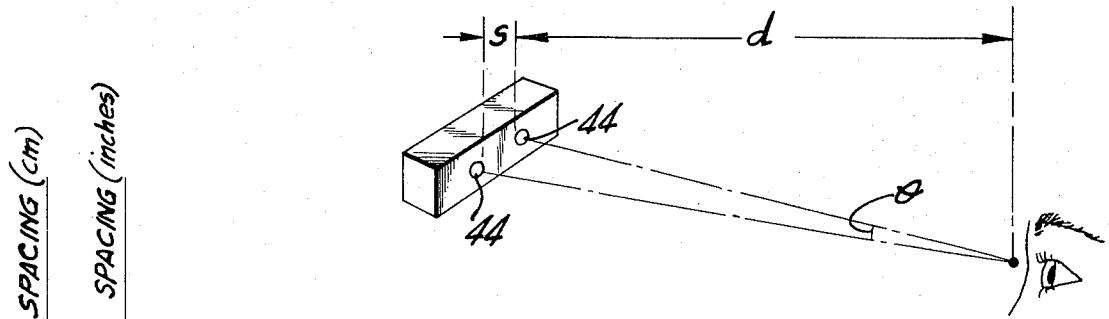
FIG. 5 is a schematic view of the device of the present invention and useful for indicating the theory of operation of the present invention.

Referring now to FIG. 5, the theory of the operation of the present device will be explained in conjunction with the stopping distances recommended. For a given speed, there is a safe distance between vehicles which will provide enough room for the rear vehicle to stop without colliding into the front vehicle. For example, at 60 miles per hour, there should be a distance of approximately 257 feet between the two vehicles in order to insure sufficient room for the trailing vehicle to stop without colliding with the forward vehicle.

For a given distance $d$ at which an observer is spaced from a pair of illuminated windows 44 of substantially equal size, the observer will note that at distances less than $d$ the two illuminated windows 44 appear as separate windows. As the observer moves a distance greater than $d$, the two illuminated windows will merge into one. As he moves again, closer than $d$, the two illuminated windows will reappear as separate. At some distance just around $d$ there will be a hazy region at which it will not be clear if there are two windows or one window. The spacing S between the two illuminated windows 44 for the distance d can be determined based upon the resolving power of the eye which is usually a function of the resolution angle $\theta$. The angle $\theta$ represents the angle between diverging lines extending from the eye until it reaches the windows at the distance d away from the eye.

Utilizing recommended distances, it has been found that for a speed of 20 miles per hour there is needed a minimum of approximately 40 feet distance between the vehicles to safely stop. For a speed of 40 miles per hour, a minimum distance of approximately 120 feet should be provided, and for 60 miles per hour, a minimum of approximately 260 feet should be provided. The relationship which can be established between the minimum distance d in feet and the speed V in miles per hour is as follows:

$$d = 3V^2/40 - V/2 + 20 \quad (1)$$

Wherein d is the distance in feet and V is the speed in miles per hour.

Utilizing the above relationship in conjunction with the resolving angle $\theta$, the spacing S in inches between the two windows can be related to the speed of the vehicle by the below formula:

$$S = (3V^2/20 - V + 40)\tan \theta/2 \quad (2)$$

For very small angles, it can be assumed that the tangent of the angle is approximately equal to the angle such that when $\theta$ is in radians formula (2) can be rewritten as:

$$S = \theta/2 \, (3V^2/20 - V + 40)$$

Although this distance represents the minimum distance needed to stop at that speed, as it is well known, this distance can be greater if the brakes on a vehicle are not functioning properly, if the vehicle is heavier than average, on certain types of road pavements or in adverse weather conditions. Furthermore, since the stopping distance depends on the reaction time of the driver, it is not sufficient to merely provide the minimum stopping distance. Accordingly, the present invention provides a visual indication of an unsafe condition when the distance is at or less than the minimum stopping distance; it provides a visual indication of a safe condition when the distance is great enough to insure a sufficient margin of error, and provides a visual indication of when caution is required. The condition of caution indicates that the minimum stopping distance is provided, but that due to delay in response time or braking action, etc., there may not be sufficient distance to insure a safe stop. Accordingly, additional distance should be provided by the driver to insure a safe condition.

An experiment was carried out to determine typical spacing for some sample speeds. It is recognized that these spacings may vary depending upon the type of light diffuser used in the window opening as well as the influence of one pair of windows upon the other pairs. However, merely by way of example the following chart indicates, for three different speeds, the distances used for the safe, unsafe and caution conditions as well as the spacing between windows which provided good results. The sample experiment was conducted with an average driver using an average car of a few years old.

| Speed (mph) | DISTANCE BETWEEN CARS (ft.) | | | SPACING BETWEEN WINDOWS | | SIZE OF WINDOWS | |
|---|---|---|---|---|---|---|---|
| | unsafe (2 lights seen) | caution zone (hazy condition) | safe (1 light seen) | inches | cm. | inches | mm. |
| 0 | 5 | 10 | 15 | 3/16" | .48 | 1/16" | 1.6 |
| 20 | 40 | 50 | 60 | 7/16" | 1.11 | 1/8" | 3.2 |
| 40 | 120 | 150 | 180 | 1¼" | 3.18 | 3/16" | 4.8 |
| 60 | 260 | 300 | 340 | 2½" | 6.35 | 5/16" | 8.0 |

It is seen that for the particular example demonstrated, at 20 miles per hour, the spacing between the windows constituting a pair was approximately 7/16 inch (1.11 cm); at 40 miles per hour, the spacing was approximately 1¼ inches (3.18cm), and at 60 miles per hour the spacing was 2½ inches (6.35 cm). Although at 0 miles per hour there would, in fact, be no spacing needed however when a vehicle approaches 0 it should also be warned when it is too close to the vehicle and thus spacing between the illuminated windows of approximately three-sixteenths inch (0.48cm) was used.

Figure 6:
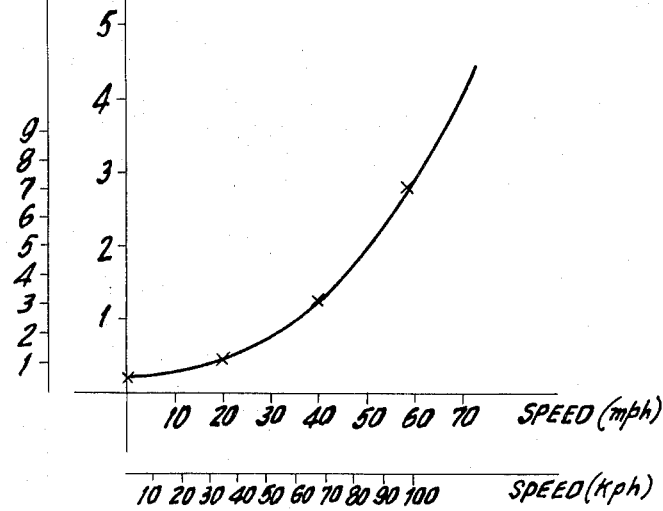
FIG. 6 is a graph showing the relationship between the spacing of the windows and the speed of the vehicle.

Referring now to FIG. 6, there is shown a graph based upon the experimental demonstration which indicated spacing both in inches and in cm, between windows constituting a pair, as a function of speed in miles per hour as well as kilometers per hour. Utilizing this graph, it is possible to determine for any speed, the spacing between windows which will provide the proper warning as to the safe or unsafe distance to a driver of a vehicle at the speed at which he is traveling.

Figure 7:
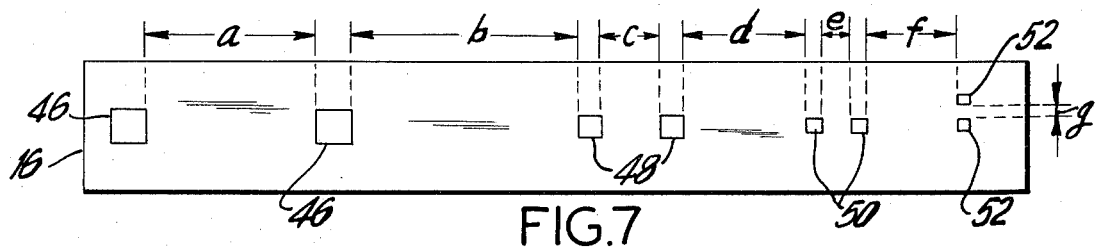
FIG. 7 is a front view of one embodiment of the screen of the present invention.

Referring now to FIG. 7, there is shown one embodiment of the front screen of the device including the windows. A first pair of windows 46, 46 is shown as being spaced apart a distance a. It is noted that the distance a is measured between the inner portions of the windows 46. The spacing a can be determined for whatever speed a warning is to be given. In the examples heretofore discussed, if the speed be chosen as 60 miles per hour, space a was used at 2½ inches (6.35 cm).

A second pair of windows 48, 48 are shown spaced apart a distance c. Again utilizing the aforementioned example, the spacing c was 1¼ inches (3.18cm) to provide a warning at 40 miles per hour. A third set of windows 50, 50 are shown spaced apart a distance e and at 20 miles per hour, the spacing was seven-sixteenths inch (1.11 cm). A fourth set of windows 52, 52 are shown spaced apart a distance g and for indicating a vehicle approaching 0 miles per hour, the spacing was three-sixteenths inch (0.48 cm). It is noted that the windows can be spaced either horizontally as for example the windows 46, 48, and 50, or vertically as the windows 52. The spacing between different pairs should be such that each pair will not merge with an adjacent pair. Thus, it is preferable that the distance $b$ between the pairs 46, 46 and the pairs 48, 48 be greater than either the distance $a$ or $c$. Similarly, the spacing $d$ should preferably be greater than the spacing $c$ or $e$; and the spacing $f$ should preferably be greater than the spacing $e$. In this way, it is easy to distinguish a single pair and each pair will not merge with an adjacent pair but the viewer will be able to easily distinguish the windows constituting a single pair.

It is noticed that the windows 46, 46 are of greater size than the windows 48 which are then greater than the size of the windows 50. Since in the given example the windows 46 are to be utilized at 60 miles per hour, they must be visible at a distance of at least 260 feet from the vehicle equipped with the present device. In order to achieve visibility at that distance, it is beneficial for the windows to be of larger size, and the intensity to be increased. In the example demonstrated the size of the windows 46 was approximately five-sixteenths inch (8mm). The size of the windows 48 were three-sixteenths inch (4.8mm) and the size of the windows 50 and 52 were respectively one-eighth inch (3.2mm) and one-sixteenth inch (1.6mm). By using smaller windows for the lower speeds, the illumination from the smaller windows will become negligible at the distance from which indications on the greater speeds are provided.

Figure 8:
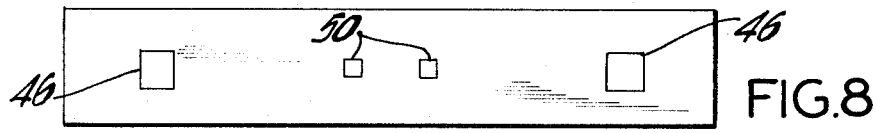
FIG. 8 and FIG. 9 are front views showing modifications of the screen of the present invention.
Figure 9:
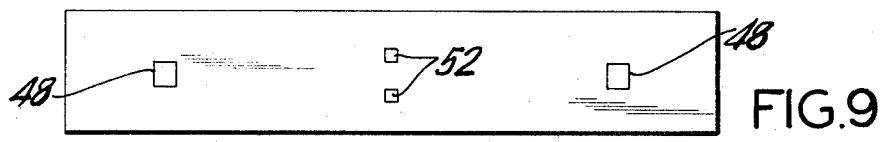

The embodiment shown in FIG. 7 utilizes a single housing 16 incorporating all of the various pairs of windows. However, it is possible to use a plurality of housings, each housing containing a single pair of windows and each housing being spaced apart from an adjacent housing containing another pair of windows. In addition, referring now to FIG. 8 and FIG. 9, it is possible to have a single housing each incorporating two pairs of windows wherein one of the pairs of windows will be spaced within the spacing of the other pair. Thus in FIG. 8, the windows 50, are located within the spacing between windows 46, 46. In FIG. 9, the windows 52, are shown located within the spacing between the windows 48, 48. When utilizing a combination of windows, as for example shown in FIG. 8 and FIG. 9, it is necessary however, that the windows located within the spacing be small compared to the windows at the outer ends. Should the inner windows be as large as the outer windows, the inner windows will have a tendency to merge with the outer windows and thereby have all four windows merge at a distance less than that required for the predetermined speed. However, when the inner windows are smaller compared to the outer larger windows, the inner windows will have a tendency of almost disappearing at the distance where the outer, larger windows will first begin to merge.

Figure 10:
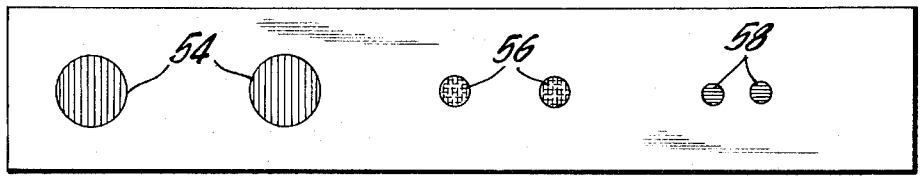
FIG. 10 is a front view of another embodiment of the screen of the present invention.

Although square windows have been shown, referring now to FIG. 10, it is seen that other shapes or designs such as circles, rectangles or the like, can be utilized in order to achieve the purpose of the present invention. In addition, referring now to FIG. 10, it is seen that colors can be utilized for separate pairs. Thus, the outer pairs of windows 54 shown in FIG. 10 are indicated as red while the second pair of windows 56 are indicated as amber color and the third pair of windows 58 are indicated as blue. The color can be provided by means of colored glass placed in front of the windows or alternately by means of a colored illuminated source such as colored bulbs, LED's, etc.

The amount of illumination required from each pair of windows should be such that the windows constituting each pair have substantially identical illumination. However, each pair may be illuminated differently from another pair. In this manner, it might be possible to utilize a brighter source of illumination for the pair which should be seen at the greatest distance and a reduced illumination for the pair to be seen at a closer distance. Furthermore, in order to make the device visible both during daylight hours and night hours, it may be possible to have a bright and dim illumination control and utilize one type of illumination during the day and one during the night. To carry out this control, the light switch on the dashboard which is utilized by the driver to control the headlights at night time can also be utilized to change the illumination of the warning device from bright to dim.

While generally the purpose of the present invention would be to have the device visible to a driver of a car in front of or in back of one equipped with the present device, it is possible to utilize windows having raised or recessed lenses to thereby spread the light in such a manner that it can be visable not only to cars in the same lane as the car equipped with the device, but to provide visibility to cars in adjacent lanes. In this manner, a car from an adjacent lane wishing to change lanes, can easily note whether the car in front of him in the lane towards which he is heading, is spaced far enough ahead of him for him to make the proper movement. Additionally, one or more lights could be included on the sides of the device, especially if the device is mounted on the top of the vehicle, to warn cars approaching from the sides. Also, it is possible to connect the device with the speedometer of the vehicle carrying the device such that when a certain speed is developed, the illumination from certain windows will blink on and off. For example, when the vehicle reaches 40 mph, the illumination from windows providing indications at 40 mph will blink. In this way a car approaching this vehicle can readily know how fast the vehicle is traveling. Stronger illumination means can be used to provide extra bright blinking lights during a fog. Furthermore, even witout the blinking arrangement since the device of the present invention will be illuminated during daytime, such illumination will serve as a warning signal during fog conditions. In addition, the sudden disappearance of this light during a heavy fog will further provide a warning of an unsafe condition. Also, by having the lights of this device it is possible that drivers will be helped in not falling asleep at the wheel, since they will have the lights to focus on and to keep them alert.

There has been disclosed heretofore the best embodiments of the invention presently contemplated. However, it is to be understood that various changes, modifications and improvements may be made hereto without departing from the spirit of the invention.

What is claimed is:

1. Apparatus for installation in a first vehicle for providing to the operator of a second vehicle spaced from said vehicle, a visual indication concerning the distance between the two vehicles, said apparatus comprising;
   a. housing means positioned with respect to said first vehicle;
   b. illumination means situated within said housing means; and c. screen means impervious to light from said illumination means disposed on at least one side thereof, said screen means being provided with a plurality of pairs of windows, lying in a single plane the windows constituting each pair being substantially identical and separated from each other by a spacing which corresponds to the resolving power of the eye at a predetermined distance, wherein the illumination from the windows of each pair is substantially equal and sufficient to be seen at said predetermined distance, each pair being spaced from adjacent pairs by an amount greater than the spacing between the windows constituting that pair, and wherein the windows constituting a pair which are separated from each other by a greater spacing, has a greater size than the windows constituting a pair which are separated by a smaller spacing.

2. The apparatus as in claim 1 and wherein each pair of windows is not contained within the space between any other pair of windows.

3. The apparatus as in claim 1 and wherein the illumination from the windows of each pair differ from the illumination from the windows of each other pair.

4. The apparatus as in claim 2 and wherein the pairs of windows whose individual windows are separated from each other by a greater spacing, has a greater illumination than the pairs of windows whose individual windows are separated from each other by lesser spacing.

5. The apparatus as in claim 3 and wherein said illumination means comprises a plurality of light means each of different intensity, each positioned respectively in conjunction with a different pair of windows.

6. The apparatus as in claim 4 and comprising lens means positioned in conjunction with each of said windows.

7. The apparatus as in claim 6 and wherein said lens means serves to disperse the light emitted from said windows.

8. The apparatus as in claim 1 and wherein each pair of windows emits light of a different color from each other pair.

9. The apparatus as in claim 1 and wherein said pairs of windows are horizontally separated from each other.

10. The apparatus as in claim 1 and wherein the windows constituting a pair are vertically separated.

11. The apparatus as in claim 1 and wherein said apparatus is mounted on the rear of said first vehicle.

12. The apparatus as in claim 1 and wherein said apparatus is mounted on the front of said first vehicle.

13. The apparatus as in claim 1 and wherein said apparatus is incorporated within the body of said first vehicle.

14. The apparatus as in claim 1 and wherein said apparatus is mounted vertically on said first vehicle.

15. The apparatus as in claim 1 and wherein said apparatus is mounted on the top of said first vehicle.

16. The apparatus as in claim 15 and wherein said housing has a second screen with windows therein disposed on the other side of the illumination means such that one screen is viewable from the front of the first vehicle and the second screen is viewable from the rear of the first vehicle, and means located on the ends of the housing to permit viewing of the illumination means from the sides of the first vehicle.

17. The apparatus as in claim 1 and wherein said illumination means has a first and second intensity, and further comprising control means for activating the first intensity during one time and the second intensity during another time.

18. The apparatus as in claim 1 and wherein said illumination means can blink on and off.

* * * * *